US012040548B2

(12) United States Patent
Takayama et al.

(10) Patent No.: US 12,040,548 B2
(45) Date of Patent: Jul. 16, 2024

(54) ANTENNA ELEMENT, ANTENNA MODULE, AND COMMUNICATION DEVICE

(71) Applicant: Murata Manufacturing Co., Ltd., Nagaokakyo (JP)

(72) Inventors: Keisei Takayama, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 248 days.

(21) Appl. No.: 17/527,198

(22) Filed: Nov. 16, 2021

(65) Prior Publication Data

US 2022/0077595 A1 Mar. 10, 2022

Related U.S. Application Data

(63) Continuation of application No. PCT/JP2020/005954, filed on Feb. 17, 2020.

(30) Foreign Application Priority Data

May 16, 2019 (JP) ................................ 2019-093023

(51) Int. Cl.
*H01Q 21/06* (2006.01)
*H01Q 1/22* (2006.01)
(Continued)

(52) U.S. Cl.
CPC ......... *H01Q 21/065* (2013.01); *H01Q 1/2208* (2013.01); *H01Q 1/38* (2013.01); *H01Q 1/422* (2013.01); *H01Q 9/0414* (2013.01)

(58) Field of Classification Search
CPC ...... H01Q 21/065; H01Q 1/2208; H01Q 1/38; H01Q 1/422; H01Q 9/0414
See application file for complete search history.

(56) References Cited

U.S. PATENT DOCUMENTS

2011/0102289 A1* 5/2011 Leem .................. H01Q 1/2283 343/893
2014/0104157 A1* 4/2014 Burns .................... H01Q 1/243 343/702
2020/0021008 A1 1/2020 Yong et al.

FOREIGN PATENT DOCUMENTS

JP 10-36104 A 2/1998
JP 11-177336 A 7/1999
(Continued)

OTHER PUBLICATIONS

Translation of the Written Opinion mailed on May 12, 2020, issued in International Application No. PCT/JP2020/005954, 6 pp.
(Continued)

*Primary Examiner* — Hoang V Nguyen
*Assistant Examiner* — Yonchan J Kim
(74) *Attorney, Agent, or Firm* — XSENSUS LLP

(57) ABSTRACT

A first RF radiating element is transmissive to visible light and includes a first electrode and a second electrode. The first electrode is formed of at least one linear conductor. The second electrode is formed of a material having a visible light transmittance greater than the visible light transmittance of a material forming the first electrode. The conductivity of the second electrode is smaller than the conductivity of the first electrode. The first electrode and the second electrode face each other in a stacking direction. The first RF radiating element includes a first region, in which the first electrode overlaps the at least one linear conductor, and a second region, in which the first electrode does not overlap the at least one linear conductor, in plan view of the first RF radiating element in the stacking direction.

18 Claims, 9 Drawing Sheets

(51) Int. Cl.

| | |
|---|---|
| ***H01Q 1/38*** | (2006.01) |
| ***H01Q 1/42*** | (2006.01) |
| ***H01Q 9/04*** | (2006.01) |

(56) References Cited

FOREIGN PATENT DOCUMENTS

| | | | |
|---|---|---|---|
| JP | 2000-138512 | A | 5/2000 |
| JP | 2001-320217 | A | 11/2001 |
| JP | 2001-320218 | A | 11/2001 |
| JP | 2013-162276 | A | 8/2013 |
| WO | 2018/186375 | A1 | 10/2018 |

OTHER PUBLICATIONS

International Search Report and Written Opinion mailed on May 12, 2020, received for PCT Application PCT/JP2020/005954, Filed on Feb. 17, 2020, 10 pages including English Translation.

* cited by examiner

1310

ANTENNA ELEMENT, ANTENNA MODULE, AND COMMUNICATION DEVICE

CROSS-REFERENCE TO RELATED APPLICATIONS

The present application claims priority to Japanese patent application JP2019-093023, filed May 16, 2019, and PCT/JP2020/005954, filed Feb. 17, 2020, the entire contents of each of which being incorporated herein by reference.

TECHNICAL FIELD

The present disclosure relates to an antenna element, an antenna module, and a communication device.

BACKGROUND ART

There has been known an antenna element in which a visible light transmission region is formed. For example, Japanese Unexamined Patent Application Publication No. 2001-320218 (Patent Document 1) discloses an antenna using a conductor electrode that forms an antenna element and that has a large number of through-holes in a mesh to allow transmission of light.

CITATION LIST

Patent Document

Patent Document 1: Japanese Unexamined Patent Application Publication No. 2001-320218

SUMMARY

Technical Problems

However, as recognized by the present inventors, when the conductor electrode as described above is used for a radiating element of an antenna element, an area capable of radiating radio waves decreases, and radiation efficiency of the antenna element decreases.

The present disclosure has been made to solve the above-described, and other, issues, and an as thereof is to suppress a decrease in radiation efficiency while ensuring transparency of an antenna element.

Example Solution to Problems

An antenna element, includes a first RF radiating element having visible light transmittance to visible light, the first RF radiating element includes a first electrode including at least one linear conductor, a second electrode including a material having a visible light transmittance greater than the visible light transmittance of a material that forms the first electrode, a ground electrode that faces the first RF radiating element in a stacking direction, and a second RF radiating element disposed between the first RF radiating element and the ground electrode so as to face the first RF radiating element, the second RF radiating element is a power feed element, wherein a conductivity of the second electrode is smaller than a conductivity of the first electrode, the first electrode and the second electrode face each other in the stacking direction, and in plan view of the first RF radiating element in the stacking direction, the first RF radiating element includes a first region in which the first electrode overlaps the at least one linear conductor, and a second region, in which the first electrode does not overlap the at least one linear conductor.

Advantageous Effects

With the use of the antenna element according to an embodiment of the present disclosure, it is possible to suppress a decrease in RF radiation efficiency while ensuring light transparency of the antenna element. This is because the first radiating element includes the first region, in which the first electrode overlaps the at least one linear conductor, and the second region, in which the first electrode does not overlap the at least one linear conductor, in plan view of the first radiating element in the stacking direction. Light transparency of the antenna element (as well as for a plurality of antenna elements in an antenna array) may be used for collection of light to provide a photovoltaic power source for a device that uses the antenna element.

DESCRIPTION OF EMBODIMENTS

Figure 1:
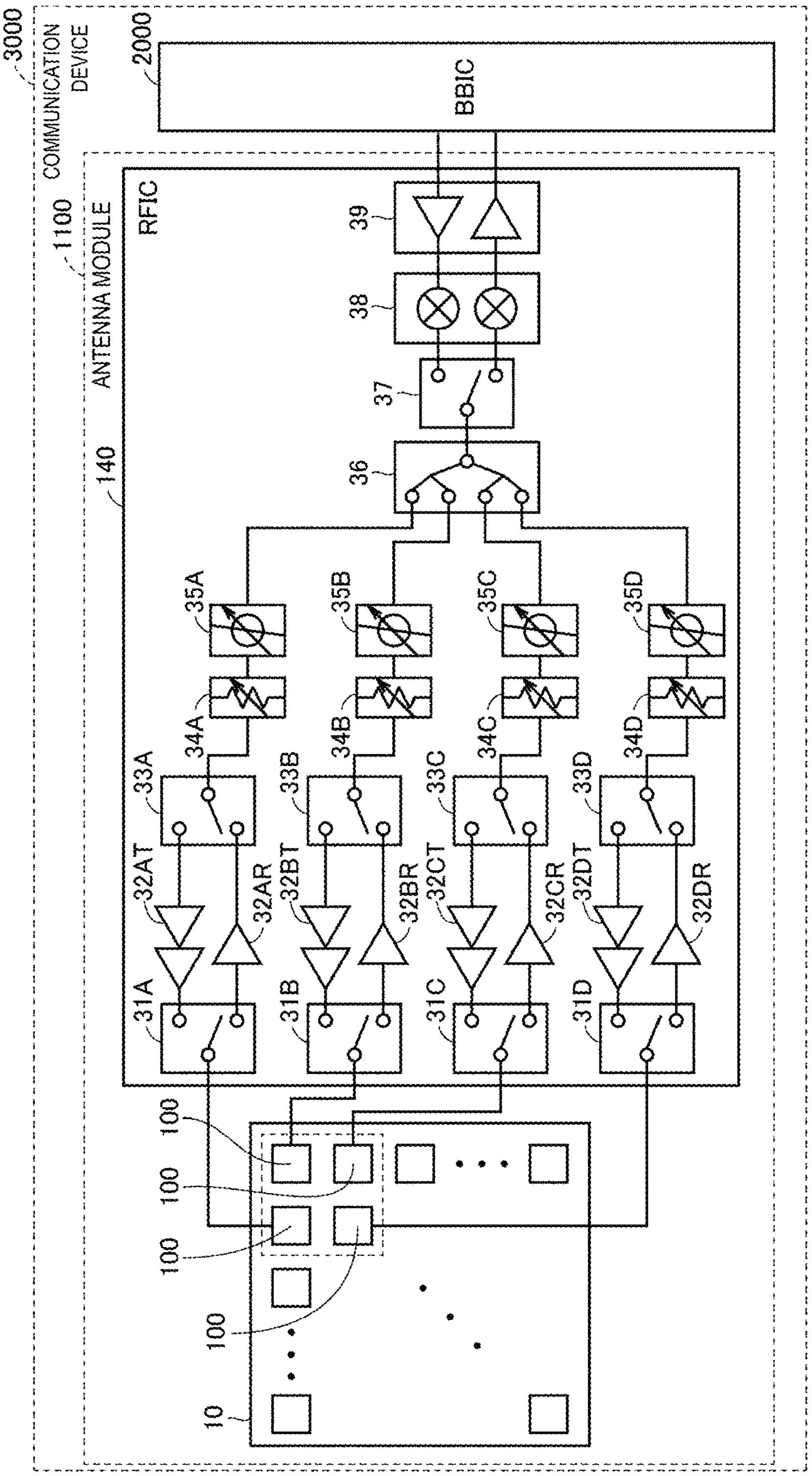
FIG. 1 is a block diagram of a communication device including an antenna array.

Hereinafter, embodiments will be described in detail with reference to the drawings. Note that the same or corresponding portions in the drawings are denoted with the same reference signs, and the description thereof will not be repeated in principle.

FIG. 1 is a block diagram of a communication device 3000 including an antenna array 10. Examples of the communication device 3000 include a mobile terminal such as a mobile phone, a smartphone, or a tablet, and a personal computer having a RF communication function.

As illustrated in FIG. 1, the communication device 3000 includes an antenna module 1100 and a BBIC (Baseband Integrated Circuit) 2000 constituting a baseband signal processing circuit. The antenna module 1100 includes an RFIC (Radio Frequency Integrated Circuit) 140, which is an example of a radio frequency (RF) element, and the antenna array 10.

The communication device 3000 up-converts a baseband signal transferred from the BBIC 2000 to the antenna module 1100 into a radio frequency signal and radiates the radio frequency signal from the antenna array 10. The communication device 3000 down-converts a radio frequency signal received by the antenna array 10 into a baseband signal and processes the baseband signal in the BBIC 2000.

In the antenna array 10, a plurality of antenna elements 100, which are patch antenna elements, are regularly arranged. In FIG. 1, illustrated is a configuration of the RFIC 140 working with four antenna elements 100 surrounded by a dotted line among the plurality of antenna elements 100 included in the antenna array 10.

The RFIC 140 includes switches 31A to 31D, 33A to 33D, and 37, power amplifiers 32AT to 32DT, low-noise amplifiers 32AR to 32DR, attenuators 34A to 34D, phase shifters 35A to 35D, a signal combiner/divider 36, a mixer 38, and an amplifier circuit 39. Respective power amplifiers 32AT to 32DT may be single stage, or multi-stage amplifiers. Furthermore, control circuitry provides respective control signals to the attenuators 34A to 34D to adjust the attenuation settings according to calculated, provided, or predetermined antenna weights. The control circuitry also provides control signals to control amounts of phase-shift imposed by the phase shifters 35A to 35D. Likewise, the control circuitry is configured to control states of the switches in the antenna module 1100.

The RFIC 140 is formed as a single chip integrated circuit component including circuit elements (switches, power amplifiers, low-noise amplifiers, control circuitry, attenuators, and phase shifters) working with the plurality of antenna elements 100 included in the antenna array 10, for example. Alternatively, the circuit elements may be formed as a single chip integrated circuit component for each antenna element 100 separately from the RFIC 140.

When a radio frequency signal is received, the switches 31A to 31D and 33A to 33D are switched to the side of the low-noise amplifiers 32AR to 32DR, and the switch 37 is switched to a reception-side amplifier in the amplifier circuit 39.

A radio frequency signal received by the antenna elements 100 passes through each of signal paths from the switches 31A to 31D to the phase shifters 35A to 35D, and signals passed through the signal paths are combined by the signal combiner/divider 36. The combined signal is down-converted to a baseband signal by the mixer 38, amplified by the amplifier circuit 39, and transferred to the BBIC 2000.

When a radio frequency (RF) signal is transmitted from the antenna array 10, the switches 31A to 31D and 33A to 33D are switched to the side of the power amplifiers 32AT to 32DT, and the switch 37 is switched to a transmission-side amplifier in the amplifier circuit 39. Receive and transmit RF signals may be in the non-exclusive frequency range of 24 GHz to 300 GHz, which includes the Millimeter frequency range.

A baseband signal transferred from the BBIC 2000 is amplified by the amplifier circuit 39 and up-converted by the mixer 38. The up-converted radio frequency signal is divided into four signals by the signal combiner/divider 36, the four signals pass through respective signal paths from the phase shifters 35A to 35D to the switches 31A to 31D, and are fed to the antenna elements 100. The directivity of the antenna array 10 may be adjusted by individually adjusting the degree of phase shift in the phase shifters 35A to 35D disposed in the respective signal paths.

Embodiment 1

Figure 2:
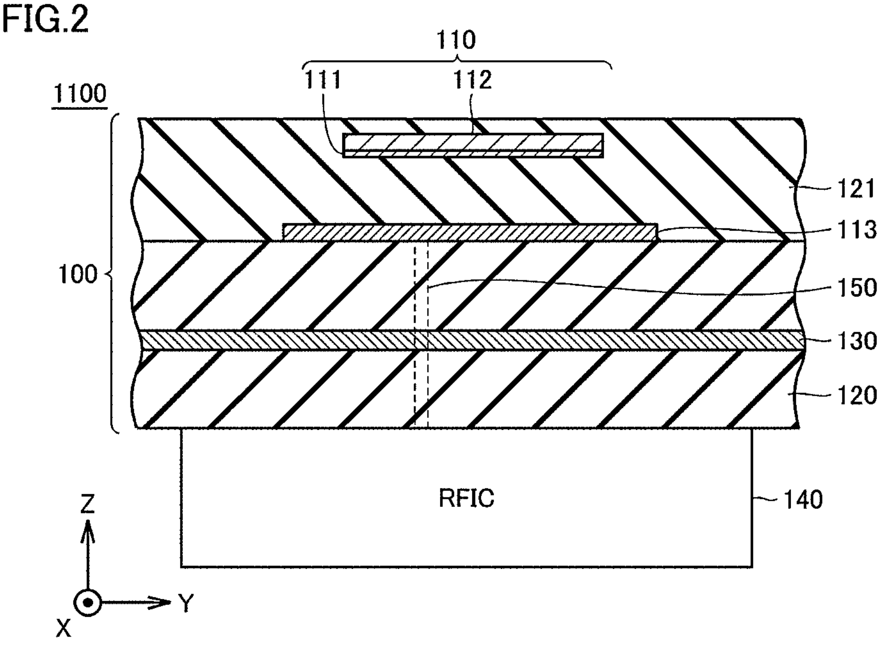
FIG. 2 is a sectional view of an antenna module according to Embodiment 1.

FIG. 2 is a sectional view of the antenna module 1100 according to Embodiment 1. In FIG. 2, the X-axis, the Y-axis, and the Z-axis are orthogonal to each other. The same applies to FIG. 3 to FIG. 13.

As illustrated in FIG. 2, the antenna module 1100 includes the antenna element 100 and the RFIC 140 (radio frequency element). The antenna element 100 includes a radiating element 110 (first radiating element, sometimes called first RF radiating element), a radiating element 113 (second RF radiating element, sometimes called second RF radiating element), dielectric layers 120 and 121, and a ground electrode 130. The dielectric layers 120 and 121 are stacked in the Z-axis direction, which is a stacking direction. The ground electrode 130 is disposed in the dielectric layer 120. The radiating element 110 and the radiating element 113 are disposed in the dielectric layer 121. The ground electrode 130 is disposed between the RFIC 140 and the radiating element 113. Note that, the dielectric layer 121 in which the radiating element 110, the radiating element 113, and the ground electrode 130 are disposed need not necessarily be divided into two layers, as is shown in FIG. 2. The dielectric layer 121 may be formed of a single layer or may be divided into three or more layers.

A via conductor 150 penetrates through the ground electrode 130 and couples the radiating element 113 and the RFIC 140. The via conductor 150 is insulated from the ground electrode 130. The RFIC 140 supplies a radio frequency signal to the radiating element 113 through the via conductor 150. More than one via conductor may be present in another embodiment.

The radiating element 110 includes a mesh electrode 111 (first electrode) and a planar transparent electrode 112 (second electrode). The mesh electrode 111 and the transparent electrode 112 face each other in the Z-axis direction. The mesh electrode 111 is formed in contact with the transparent electrode 112. The thickness of the mesh electrode 111 in the Z-axis direction and the thickness of the transparent electrode 112 in the Z-axis direction are 3 μm and 6 μm, respectively, although the thicknesses may vary from 1.5 μm and 3 μm to 6 μm and 12 μm respectively. The visible light transmittance of the material forming the transparent electrode 112 is greater than the visible light transmittance of the material forming the mesh electrode 111. The visible light transmittance of the transparent electrode 112 may be substantially the same as the visible light transmittance of the entirety of the mesh electrode 111. The conductivity (electrical conductivity) of the transparent electrode 112 is smaller than the conductivity of the mesh electrode 111 and greater than the conductivity of the dielectric layer 121. The conductivity of the transparent electrode 112 is 1/1000 or less of the conductivity of the mesh electrode 111, for example. The mesh electrode 111 is disposed on a surface of the transparent electrode 112 that is on the same side as the radiating element 113, and thus the mesh electrode 111 is disposed between the transparent electrode 112 and the radiating element 113. The mesh electrode 111 is made of copper, aluminum, silver, or chromium, for example.

The transparent electrode 112 is made of indium tin oxide (ITO). The transparent electrode 112 may be formed of zinc oxide, tin oxide, or graphene or may be formed of a translucent conductor (such as chromium or aluminum with the thickness of 100 nm or less), for example.

In the antenna module 1100, the radiating element 113 is a power feed element, and the mesh electrode 111 is a parasitic element. Note that, each of the mesh electrode 111 and the radiating element 113 may be a power feed element.

Figure 3:
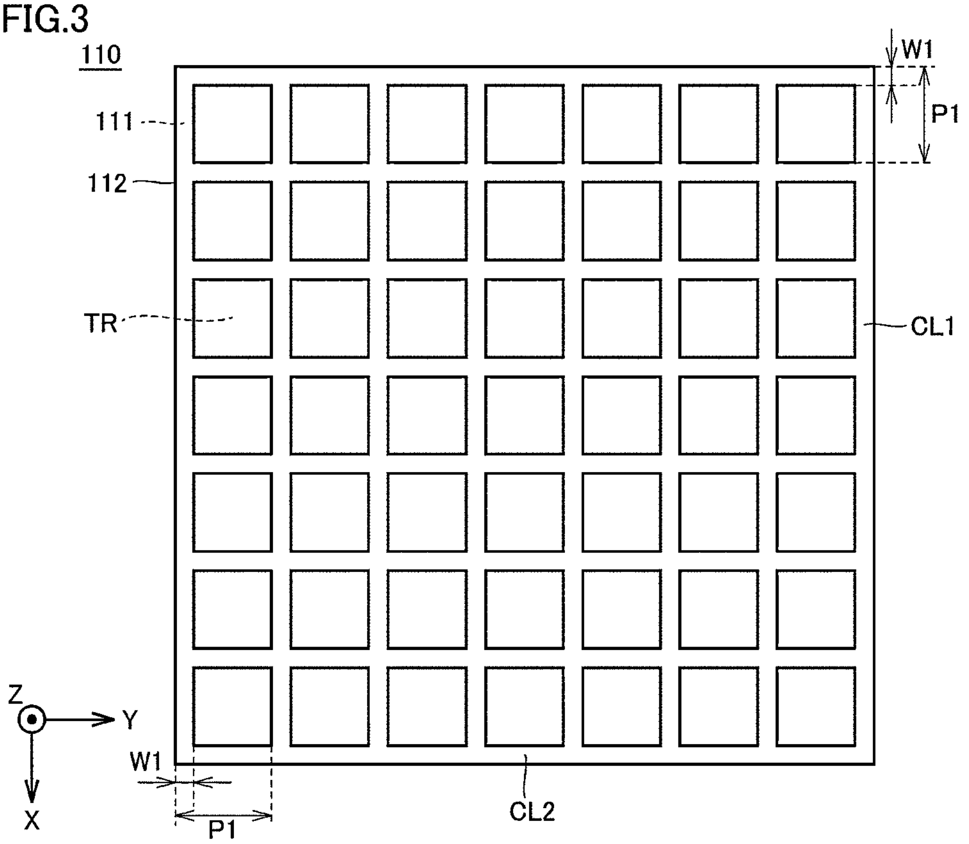
FIG. 3 is a plan view of an antenna element in FIG. 2 in a Z-axis direction.

FIG. 3 is a plan view of one radiating element, namely the radiating element 110 in FIG. 2 as viewed in the Z-axis direction. As illustrated in FIG. 3, the mesh electrode 111 is seen through the transparent electrode 112. The mesh electrode 111 includes a plurality of linear conductors CL1 extending in an X-axis direction and a plurality of linear conductors CL2 extending in a Y-axis direction. The plurality of linear conductors CL1 and CL2 are formed on the transparent electrode 112, and located under the transparent electrode 112 in this view. The plurality of linear conductors CL1 and the plurality of linear conductors CL2 intersect with each other to form the mesh electrode 111 in a mesh, with interstices (openings) formed between CL1 and CL2. One hole, light transmission region (TR), extends in the Z-axis direction and is surrounded by two linear conductors CL1 and two linear conductors CL2. The plurality of holes TR (second region) are regularly arranged to form a visible light transmission region (TR). That is, the RF radiating element 110 has a region (first region), in which the mesh electrode 111 overlaps the plurality of linear conductors CL1 and CL2, and the hole TR, in which the mesh electrode 111 does not overlap the plurality of linear conductors CL1 and CL2.

A width W1 and a pitch P1 of the linear conductors CL1 and CL2 are 5 μm and 20 μm, respectively, for example. The ratio of the area of the plurality of holes TR to the area of the transparent electrode 112 preferably is 50% or more in plan view in the Z-axis direction. The mesh electrode 111 preferably has a visible light transmittance of 80% or more. The ratio of 50% or more as well as the light transmittance of the mesh electrode combines to allow substantial light to penetrate the radiating element 110 for collection and use in photovoltaic conversion and power generation for use in powering other circuitry as well as providing primary or ancillary power to the RFIC 140, in this non-limiting example.

In the antenna element 100, the conductivity of the mesh electrode 111 is greater than the conductivity of the transparent electrode 112. This leads to the reduction of the current passing loss (resistive losses) on the back surface of the radiating element 110 to which the operating current concentrates. The electric field generated by the current flowing through the mesh electrode 111 is dispersed over the entire radiation surface of the radiating element 110 by the transparent electrode 112. Consequently, the radio wave whose intensity is increased by the mesh electrode 111 is radiated from the entire radiation surface of the radiating element 110. That is, although the transparency of the transparent electrode 112 causes a decrease in radiation efficiency, the mesh electrode 111 may compensate for it in the antenna element 100.

The radiation efficiency of an antenna configuration (antenna element or antenna module) is a proportion of electric power radiated to space from the antenna configuration as a radio wave to electric power input to the antenna configuration. A lower radiation efficiency means a higher proportion of the electric power is consumed inside the antenna configuration from the electric power input to the antenna configuration.

Figure 4:
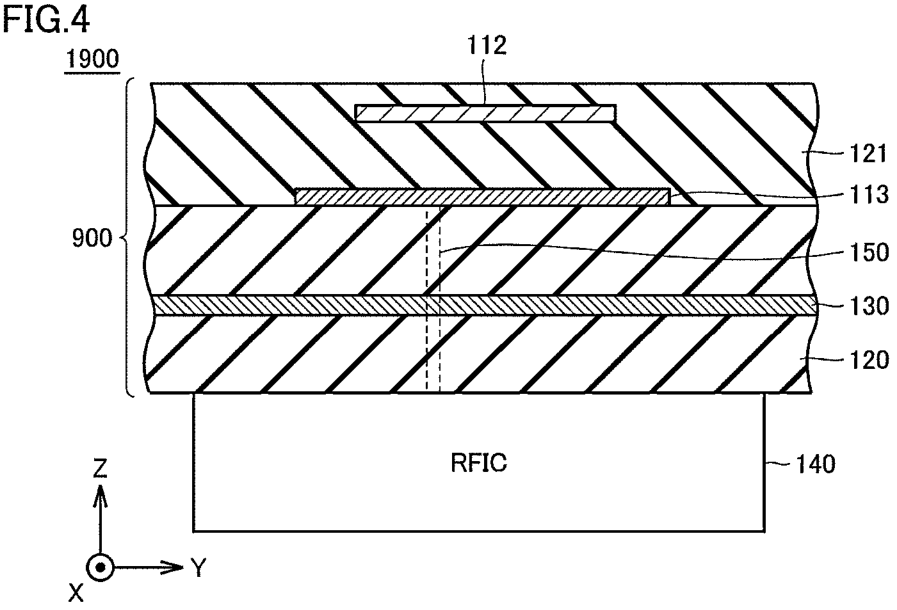
FIG. 4 is a sectional view of an antenna module according to a comparative example.

FIG. 4 is a sectional view of an antenna module 1900 according to a comparative example. The antenna module 1900 has a configuration in which the antenna element 100 in FIG. 2 is replaced with an antenna element 900. The antenna element 900 has a configuration in which the mesh electrode 111 is removed from the antenna element 100. Since the configuration other than these is the same, the description thereof will not be repeated.

The visible light transmittance of the transparent electrode 112 of the antenna element 900 is substantially equal to the visible light transmittance of the radiating element 110 of the antenna element 100. However, the radiation efficiency of the antenna element 900 is −0.914 dB, whereas the radiation efficiency of the antenna element 100 is −0.341 dB. The antenna element 100 is superior to the antenna element 900 in terms of radiation efficiency, and thus with the use of the antenna element 100, it is possible to suppress a decrease in radiation efficiency while ensuring transparency of the transparent electrode 112.

Figure 5:
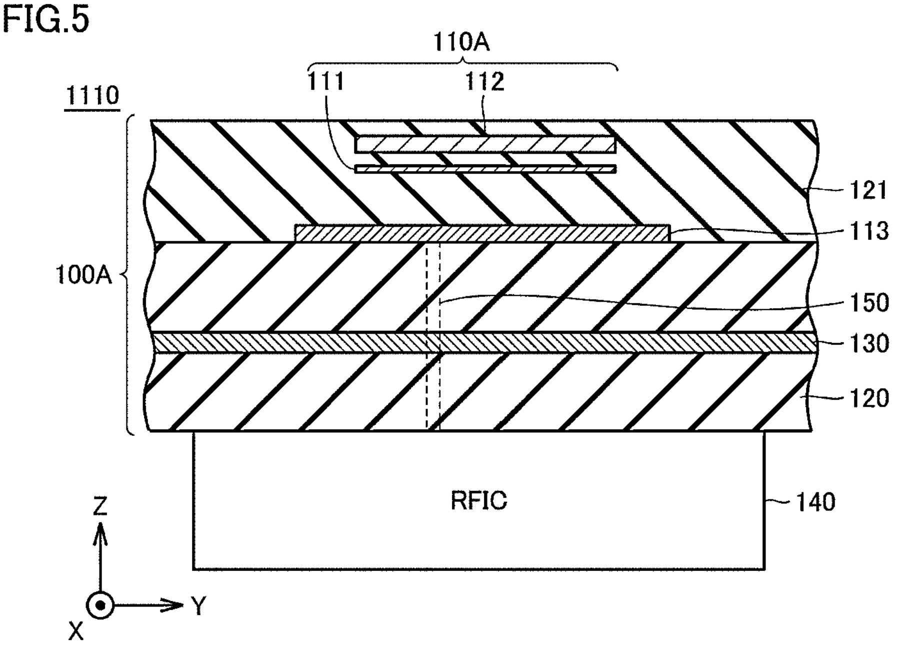
FIG. 5 is a sectional view of an antenna module according to Modification 1 of Embodiment 1.

FIG. 5 is a sectional view of an antenna module 1110 according to Modification 1 of Embodiment 1. The antenna module 1110 has a configuration in which the antenna element 100 in FIG. 2 is replaced with an antenna element 100A. The antenna element 100A has a configuration in which the radiating element 110 of the antenna element 100 is replaced with a radiating element 110A (first radiating element). Since the configuration other than these is the same, the description thereof will not be repeated.

As illustrated in FIG. 5, in the radiating element 110A, the mesh electrode 111 and the transparent electrode 112 are disposed apart from each other. The distance between the mesh electrode 111 and the transparent electrode 112 is 20 μm, for example. An adhesive layer may be formed between the mesh electrode 111 and the transparent electrode 112. The radiation efficiency of the antenna element 100A is −0.455 dB. The radiation efficiency of the antenna element 100A is superior to the radiation efficiency (−0.914 dB) of the antenna element 900.

In the antenna element 100A, a member having a smaller conductivity than the conductivity of the transparent electrode 112 is disposed between the mesh electrode 111 and the transparent electrode 112. This leads to greater suppression of the electric power transfer from the mesh electrode 111 to the transparent electrode 112 than in the antenna element 100. Accordingly, the radiation efficiency of the antenna element 100A is lower than the radiation efficiency of the antenna element 100.

Figure 6:
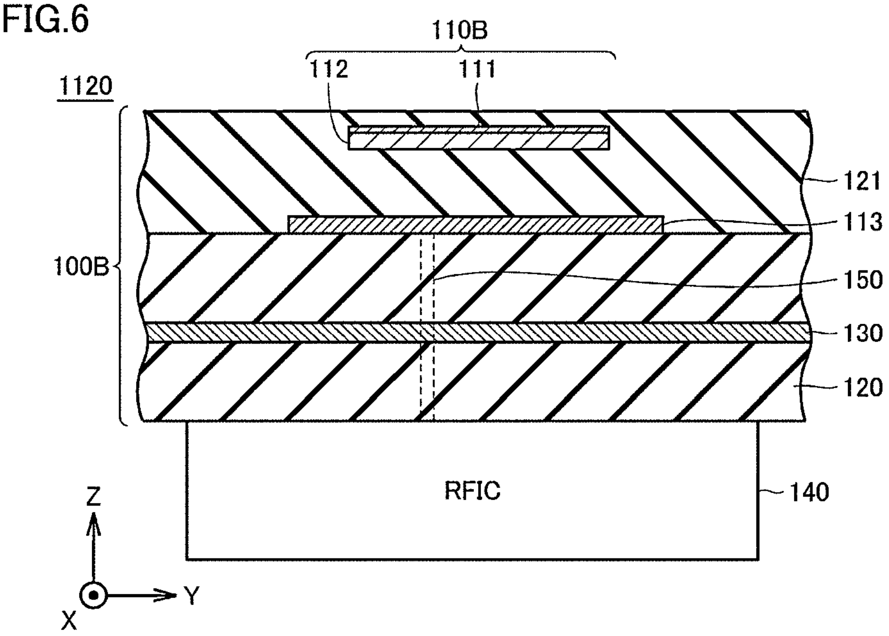
FIG. 6 is a sectional view of an antenna module according to Modification 2 of Embodiment 1.

FIG. 6 is a sectional view of an antenna module 1120 according to Modification 2 of Embodiment 1. The antenna module 1120 has a configuration in which the antenna element 100 in FIG. 2 is replaced with an antenna element 100B. The antenna element 100B has a configuration in which the radiating element 110 of the antenna element 100 is replaced with a radiating element 110B (first radiating element). Since the configuration other than these is the same, the description thereof will not be repeated.

As illustrated in FIG. 6, the dispositions of the mesh electrode 111 and the transparent electrode 112 in the Z-axis direction in the radiating element 110B is opposite to the dispositions of the mesh electrode 111 and the transparent electrode 112 in the Z-axis direction in the radiating element 110 in FIG. 2. The transparent electrode 112 is disposed between the mesh electrode 111 and the radiating element 113. The mesh electrode 111 is disposed on the surface of the transparent electrode 112 at a side opposite to the radiating element 113.

The radiation efficiency of the antenna element 100B is −0.847 dB. The radiation efficiency of the antenna element 100B is superior to the radiation efficiency (−0.914 dB) of the antenna element 900. In the antenna element 100B, the mesh electrode 111 is formed on the front surface of the radiating element 110B in which the density of the operation current is low. This leads to the suppression of a loss reduction effect. Accordingly, the radiation efficiency of the antenna element 100B is lower than the radiation efficiency of the antenna element 100.

In Embodiment 1 and Modifications 1 and 2 thereof, the case in which the antenna element is a patch antenna element has been described. The antenna element according to the embodiment is not limited to the patch antenna element and may be a linear antenna element such as a dipole antenna.

As described above, with the use of the antenna elements according to Embodiment 1 and Modifications 1 and 2 thereof, it is possible to suppress a decrease in radiation efficiency while ensuring transparency of the antenna element.

Embodiment 2

Figure 7:
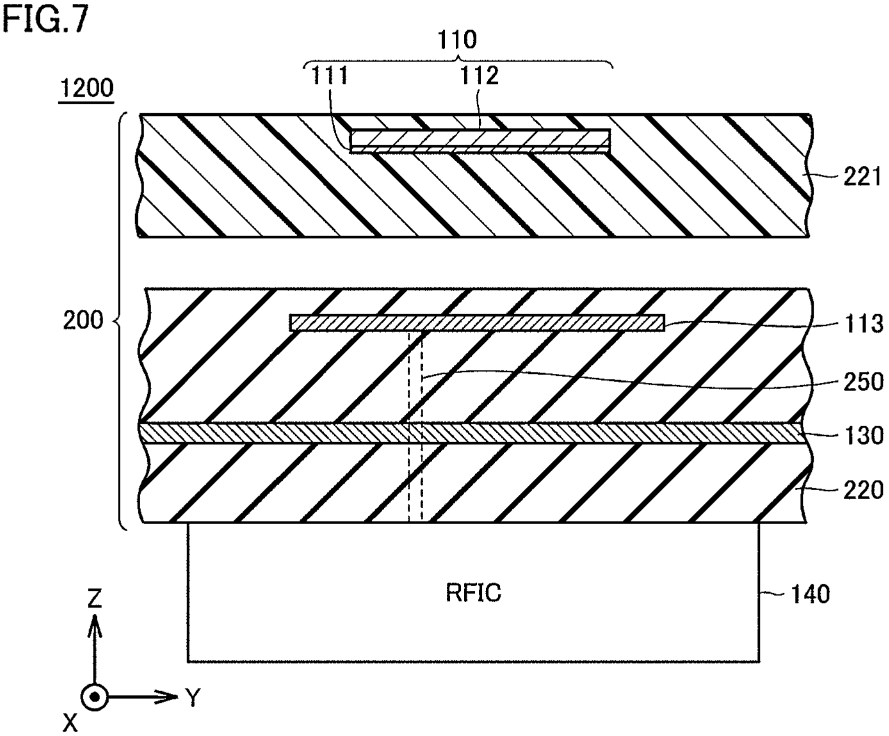
FIG. 7 is a sectional view of an antenna module according to Embodiment 2.

FIG. 7 is a sectional view of an antenna module 1200 according to Embodiment 2. The antenna module 1200 has a configuration in which the antenna element 100 in FIG. 2 is replaced with an antenna element 200. The antenna element 200 has a configuration in which the dielectric layers 120 and 121 and the via conductor 150 of the antenna element 100 are replaced with a dielectric layer 220, a housing 221, and a via conductor 250. Since the configuration other than these is the same, the description thereof will not be repeated.

As illustrated in FIG. 7, the radiating element 110 is disposed inside a member forming the housing 221. The radiating element 113 is disposed in the dielectric layer 220. The via conductor 250 penetrates through the ground electrode 130 and couples the radiating element 113 and the RFIC 140. The via conductor 250 is insulated from the ground electrode 130. The RFIC 140 supplies a radio frequency signal to the radiating element 113 through the via conductor 250.

As described above, with the use of the antenna module according to Embodiment 2, it is possible to suppress a decrease in radiation efficiency while ensuring transparency of the antenna element.

Embodiment 3

Figure 8:
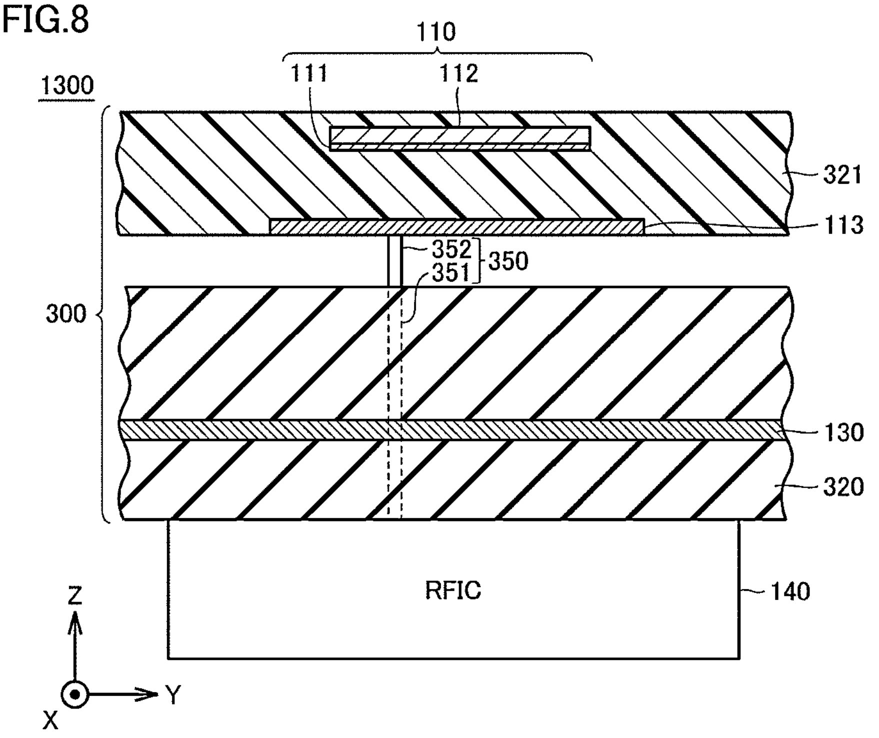
FIG. 8 is a sectional view of an antenna module according to Embodiment 3.

FIG. 8 is a sectional view of an antenna module 1300 according to Embodiment 3. The antenna module 1300 has a configuration in which the antenna element 200 in FIG. 7 is replaced with an antenna element 300. The antenna element 300 has a configuration in which the dielectric layer 220, the housing 221, and the via conductor 250 of the antenna element 200 are replaced with a dielectric layer 320, a housing 321, and a coupling conductor 350. Since the configuration other than these is the same, the description thereof will not be repeated.

As illustrated in FIG. 8, the housing 321 accommodates the dielectric layer 320 and the RFIC 140. The radiating element 110 and the radiating element 113 are disposed inside a member forming the housing 321. The surface of the radiating element 113 at the side of the dielectric layer 320 is exposed from the housing 321. The coupling conductor 350 includes a via conductor 351 and a conductive member 352.

The via conductor 351 is formed in the dielectric layer 320, and one end of the via conductor 351 is coupled to the RFIC 140. The via conductor 351 penetrates through the ground electrode 130 and is insulated from the ground electrode 130. The conductive member 352 is formed between the dielectric layer 320 and the housing 321, and one end of the conductive member 352 is coupled to the other end of the via conductor 351. The conductive member 352 is formed of a member that exerts elastic force such as a spring terminal or a conductive elastomer, for example.

When the housing 321 is attached to the dielectric layer 320, the other end of the conductive member 352 presses the radiating element 113 with a predetermined elastic force. With the other end of the conductive member 352 being pressed to the radiating element 113, the other end of the conductive member 352 is electrically coupled to the radiating element 113. The RFIC 140 supplies a radio frequency signal to the radiating element 113 through the coupling conductor 350.

Figure 9:
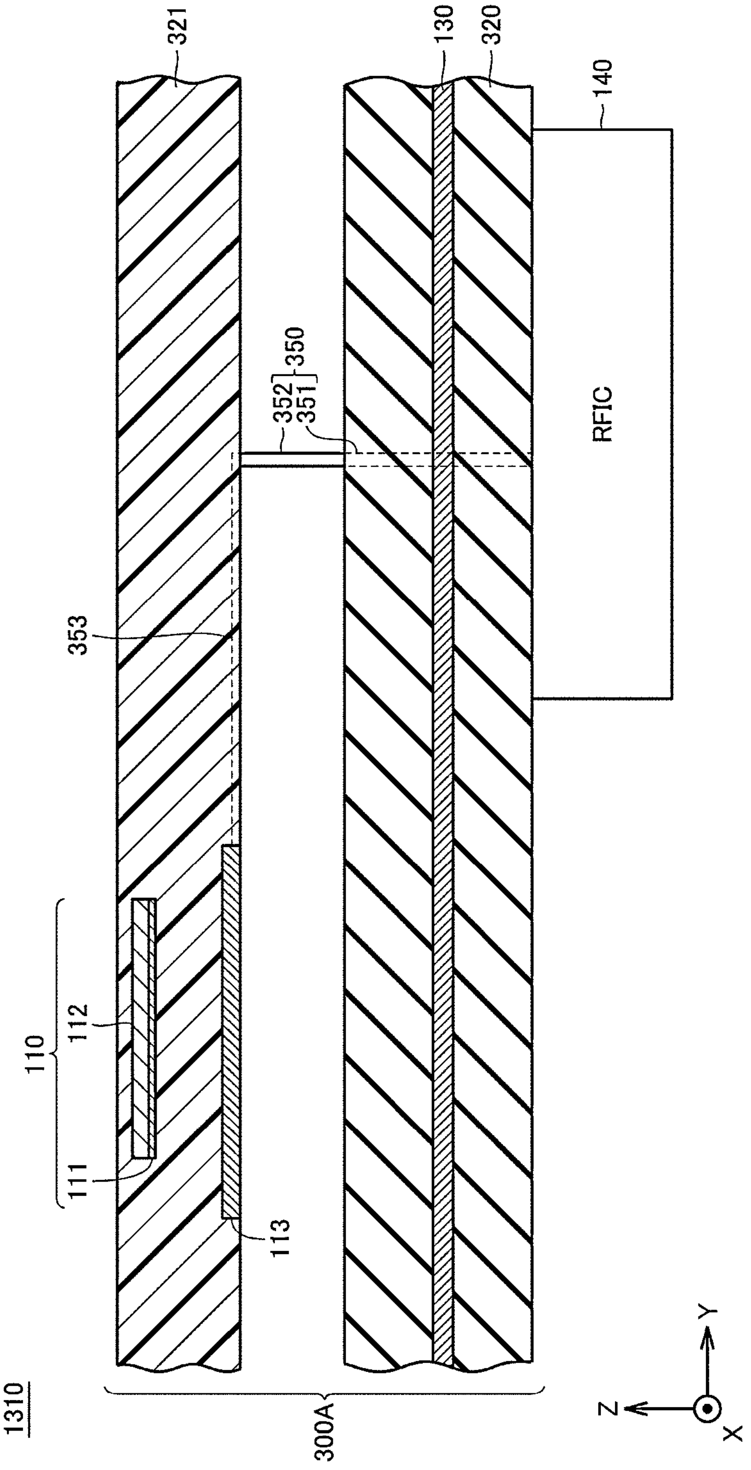
FIG. 9 is a sectional view of an antenna module according to a modification of Embodiment 3.

FIG. 9 is a sectional view of an antenna module 1310 according to a modification of Embodiment 3. The antenna module 1310 has a configuration in which the antenna element 300 in FIG. 8 is replaced with an antenna element 300A. The antenna element 300A has a configuration in which a line conductor 353 is added to the configuration of the antenna element 300 and the positions of the radiating element 110 and the radiating element 113 are moved along the Y-axis direction.

As illustrated in FIG. 9, the radiating element 110 and the radiating element 113 do not overlap the RFIC 140 in the Z-axis direction. When the housing 321 is attached to the dielectric layer 320, the other end of the conductive member 352 presses the line conductor 353 with a predetermined elastic force. By being pressed to the line conductor 353, the other end of the conductive member 352 is electrically coupled to the line conductor 353. The line conductor 353 couples the radiating element 113 and the other end of the conductive member 352. The RFIC 140 supplies a radio frequency signal to the radiating element 113 through the coupling conductor 350 and the line conductor 353.

As described above, with the use of the antenna modules according to Embodiment 3 and the modification thereof, it is possible to suppress a decrease in radiation efficiency while ensuring transparency of the antenna element.

Embodiment 4

Figure 10:
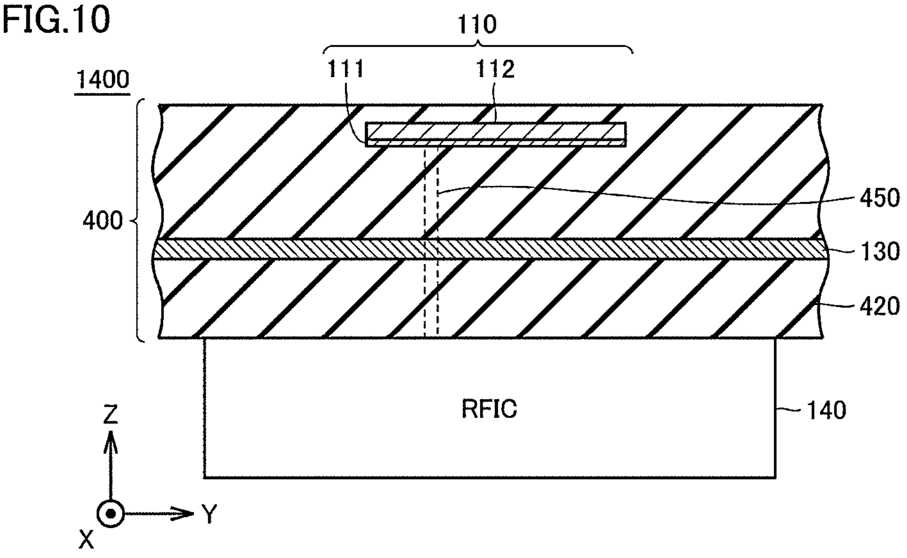
FIG. 10 is a sectional view of an antenna module according to Embodiment 4.

FIG. 10 is a sectional view of an antenna module 1400 according to Embodiment 4. The antenna module 1400 has a configuration in which the antenna element 100 in FIG. 2 is replaced with an antenna element 400. The antenna element 400 has a configuration in which the dielectric layer 121 and the radiating element 113 are removed from the configuration of the antenna element 100, and the dielectric layer 120 and the via conductor 150 are replaced with a dielectric layer 420 and a via conductor 450, respectively. Since the configuration other than these is the same, the description thereof will not be repeated.

As illustrated in FIG. 10, the radiating element 110 is disposed in the dielectric layer 420. The mesh electrode 111 is disposed on the surface of the transparent electrode 112 at the side of the ground electrode 130, and thus the mesh electrode 111 is disposed between the transparent electrode 112 and the ground electrode 130. The via conductor 450 penetrates through the ground electrode 130 and couples the mesh electrode 111 and the RFIC 140. The via conductor 450 is insulated from the ground electrode 130. The RFIC 140 supplies a radio frequency signal to the mesh electrode 111 through the via conductor 450. In Embodiment 4, the mesh electrode 111 is a power feed element.

Figure 11:
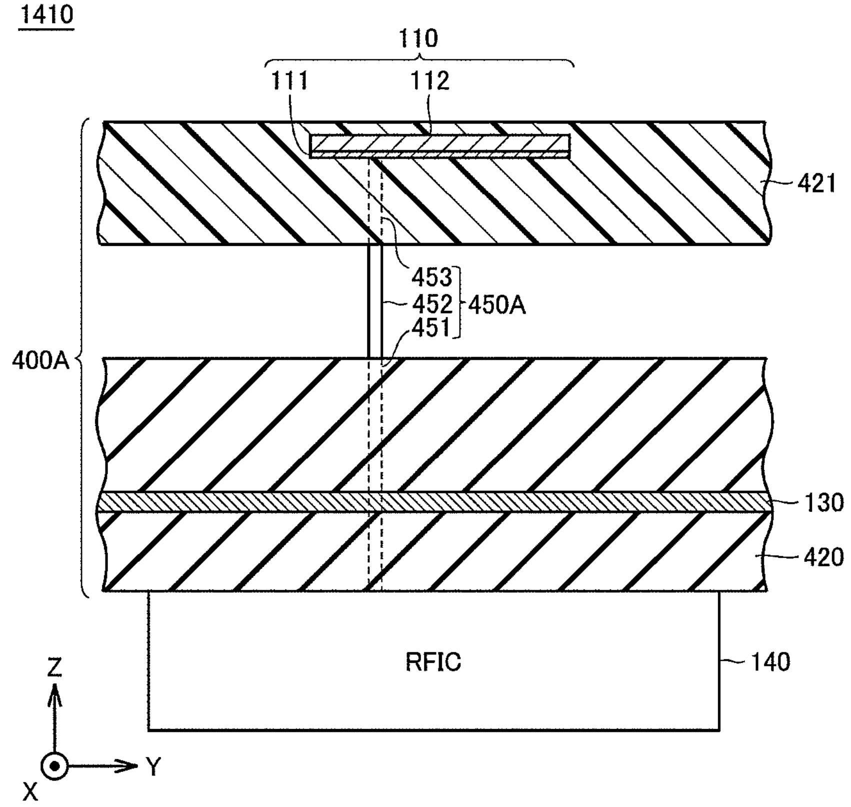
FIG. 11 is a sectional view of an antenna module according to Modification 1 of Embodiment 4.

FIG. 11 is a sectional view of an antenna module 1410 according to Modification 1 of Embodiment 4. The antenna module 1410 has a configuration in which the antenna element 400 in FIG. 10 is replaced with an antenna element 400A. The antenna element 400A has a configuration in which a housing 421 is added to the configuration of the antenna element 400 and the via conductor 450 is replaced with a coupling conductor 450A. Since the configuration other than these is the same, the description thereof will not be repeated.

As illustrated in FIG. 11, the housing 421 accommodates the dielectric layer 420 and the RFIC 140. The radiating element 110 is disposed in a member forming the housing 421. The coupling conductor 450A includes a via conductor 451, a conductive member 452, and a via conductor 453.

The via conductor 451 is formed in the dielectric layer 420, and one end of the via conductor 451 is coupled to the RFIC 140. The via conductor 451 penetrates through the ground electrode 130 and is insulated from the ground electrode 130. The via conductor 453 is formed in the housing 421. One end of the via conductor 453 is coupled to the mesh electrode 111, and the other end of the via conductor 453 is exposed from the housing 421. The conductive member 452 is formed between the dielectric layer 420 and the housing 421, and one end of the conductive member 452 is coupled to the other end of the via conductor 451. The conductive member 452 is formed of a member that exerts elastic force such as a spring terminal or a conductive elastomer, for example.

When the housing 421 is attached to the dielectric layer 420, the other end of the conductive member 452 presses the other end of the via conductor 453 with a predetermined elastic force. By being pressed to the other end of the via conductor 453, the other end of the conductive member 452 is electrically coupled to the other end of the via conductor 453. The RFIC 140 supplies a radio frequency signal to the mesh electrode 111 through the coupling conductor 450A.

Figure 12:
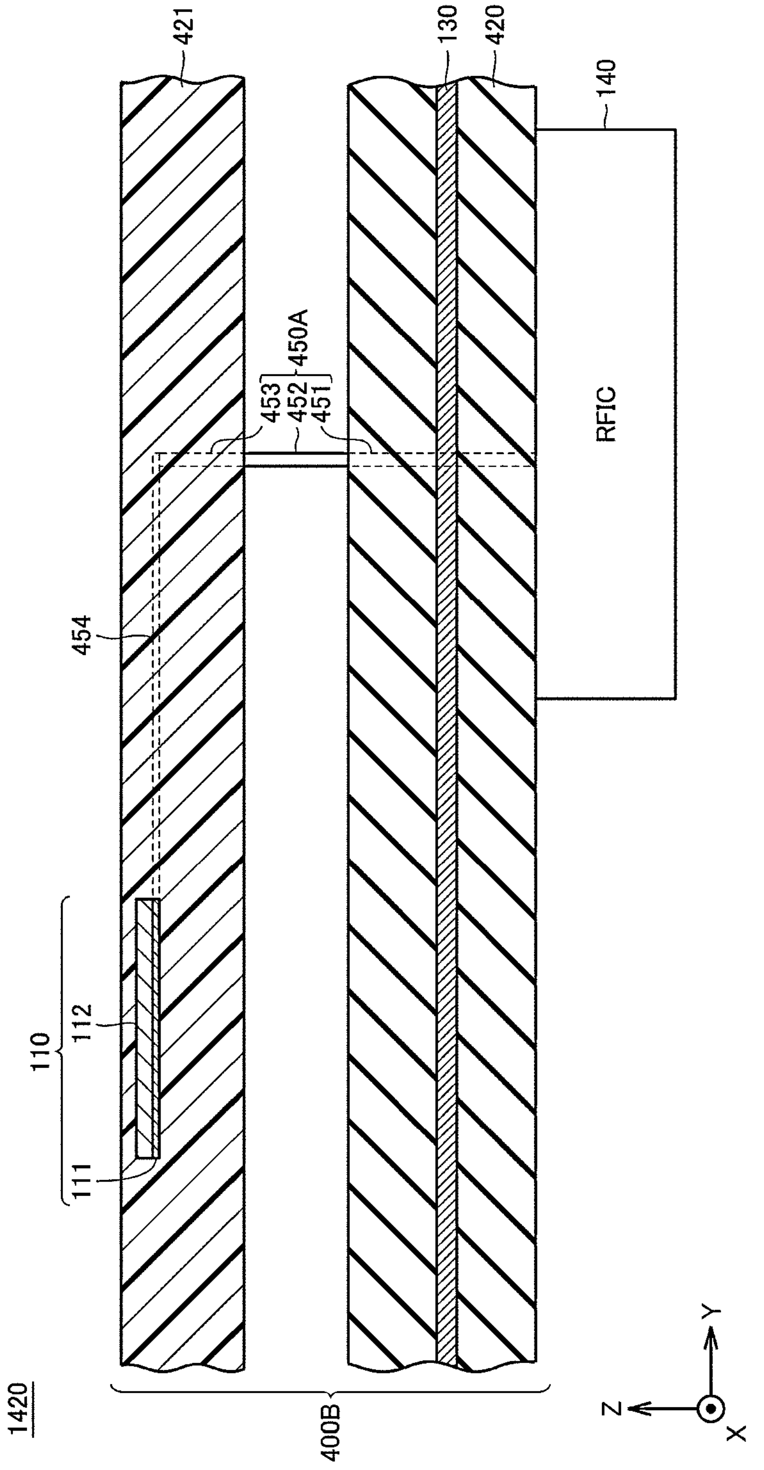
FIG. 12 is a sectional view of an antenna module according to Modification 2 of Embodiment 4.

FIG. 12 is a sectional view of an antenna module 1420 according to Modification 2 of Embodiment 4. The antenna module 1420 has a configuration in which the antenna element 400A in FIG. 11 is replaced with an antenna element 400B. The antenna element 400B has a configuration in which a line conductor 454 is added to the configuration of the antenna element 400A and the position of the radiating element 110 is moved along the Y-axis direction.

As illustrated in FIG. 12, the radiating element 110 does not overlap the RFIC 140 in the Z-axis direction. The line conductor 454 couples the mesh electrode 111 and the via conductor 453. The RFIC 140 supplies a radio frequency signal to the mesh electrode 111 through the coupling conductor 450A and the line conductor 454.

As described above, with the use of the antenna modules according to Embodiment 4 and Modifications 1 and 2 thereof, it is possible to suppress a decrease in radiation efficiency while ensuring transparency of the antenna element.

Embodiment 5

Figure 13:
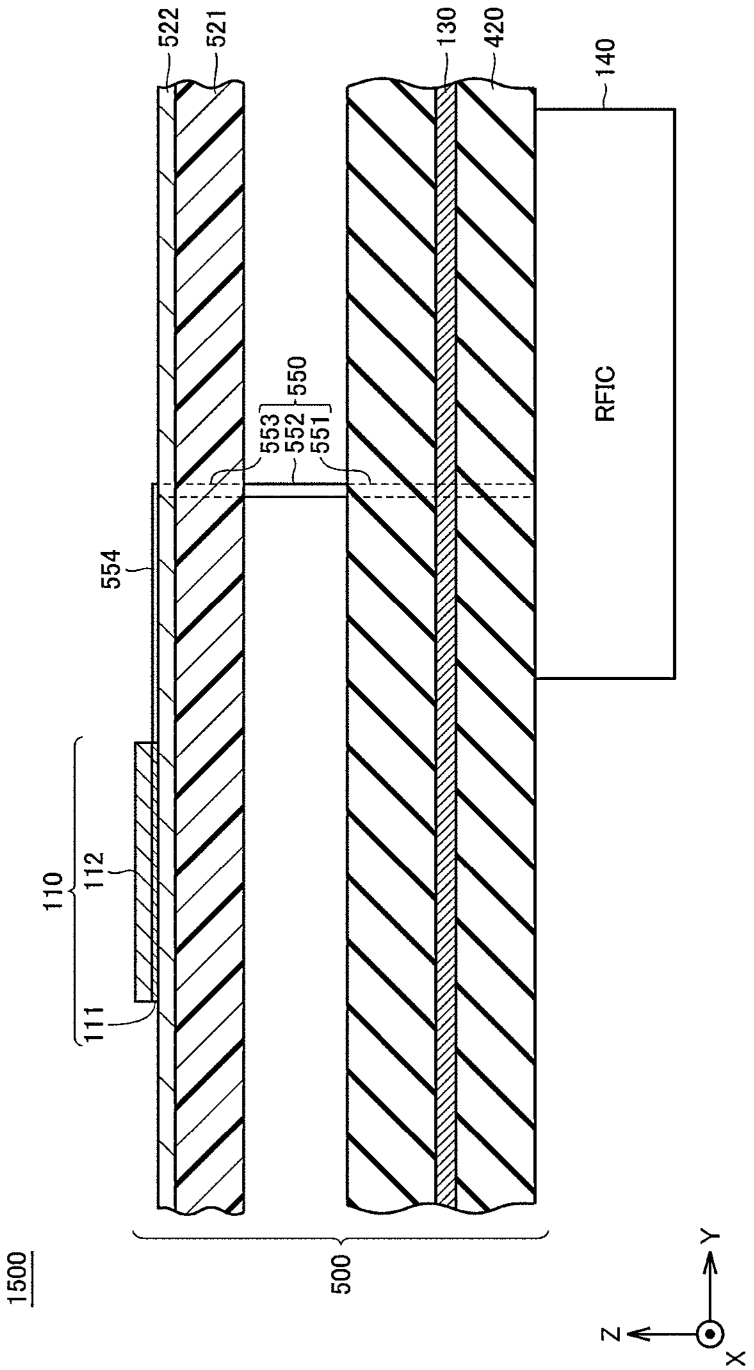
FIG. 13 is a sectional view of an antenna module according to Embodiment 5.

FIG. 13 is a sectional view of an antenna module 1500 according to Embodiment 5. The antenna module 1500 has a configuration in which the antenna element 400B in FIG. 12 is replaced with an antenna element 500. The antenna element 500 has a configuration in which the housing 421, the coupling conductor 450A, and the line conductor 454 of the antenna element 400B are replaced with a housing 521, a coupling conductor 550, and a line conductor 554, respectively, and an LCD (Liquid Crystal Display) 522 (liquid crystal member) is added. Since the configuration other than these is the same, the description thereof will not be repeated.

As illustrated in FIG. 13, the housing 521 accommodates the dielectric layer 420 and the RFIC 140. The LCD 522 is disposed outside the housing 521. The radiating element 110 is disposed on the LCD 522. The line conductor 554 is formed on the LCD 522 and coupled to the mesh electrode 111. The radiating element 110 and the line conductor 554 may be disposed on the LCD 522 in the manufacturing process of the LCD 522. The coupling conductor 550 includes a via conductor 551, a conductive member 552, and a via conductor 553.

The via conductor 551 is formed in the dielectric layer 420, and one end of the via conductor 551 is coupled to the RFIC 140. The via conductor 551 penetrates through the ground electrode 130 and is insulated from the ground electrode 130. The via conductor 553 is formed in the housing 521. One end of the via conductor 553 is coupled to the line conductor 554, and the other end of the via conductor 553 is exposed from the housing 521. The via conductor 553 penetrates through the LCD 522 and is insulated from the LCD 522. The conductive member 552 is formed between the dielectric layer 420 and the housing 521. One end of the conductive member 552 is coupled to the other end of the via conductor 551. The conductive member 552 is formed of a member that exerts elastic force such as a spring terminal or a conductive elastomer, for example.

When the housing 521 is attached to the dielectric layer 420, the other end of the conductive member 552 presses the other end of the via conductor 553 with a predetermined elastic force. By being pressed to the other end of the via conductor 553, the other end of the conductive member 552 is electrically coupled to the other end of the via conductor 553. The RFIC 140 supplies a radio frequency signal to the mesh electrode 111 through the coupling conductor 550 and the line conductor 554.

As the antenna module 1500 becomes smaller, a space in which the radiating element 110 may be disposed becomes limited further inside the antenna module 1500. Further, as the position of the radiating element 110 is closer to a surface of the antenna module 1500, the radiation efficiency of the antenna module 1500 may be improved more. Incidentally, with the use of the radiating element 110 in which transparency is ensured, the radiating element 110 may be disposed on the LCD 522 forming the surface of the antenna module 1500 without impairing the display of the LCD 522. That is, with the use of the radiating element 110, the reduction of the antenna module in size may be achieved without impairing the display of the antenna module, and the radiation efficiency of the antenna module may be improved. Further, the transparent electrode 112 suppresses separation of the mesh electrode 111 from the LCD 522. From the viewpoint of preventing the separation, it is preferable that the transparent electrode 112 covers the mesh electrode 111 in plan view of the radiating element 110 in the Z-axis direction.

As described above, with the use of the antenna module according to Embodiment 5, it is possible to suppress a decrease in radiation efficiency while ensuring transparency of the antenna element.

It is also expected that the embodiments disclosed herein may be implemented in combination with each other as appropriate insofar as no contradiction arises. It should be understood that the embodiments disclosed herein are illustrative and non-restrictive in every respect. It is intended that the scope of the present disclosure be indicated by the appended claims rather than the foregoing description and that all changes within the meaning and range of equivalency of the appended claims shall be embraced therein.

REFERENCE SIGNS LIST

10 ANTENNA ARRAY
31A to 31D, 33A to 33D, 37 SWITCH
32AR to 32DR LOW-NOISE AMPLIFIER
32AT to 32DT POWER AMPLIFIER
34A to 34D ATTENUATOR
35A to 35D PHASE SHIFTER
36 SIGNAL COMBINER/DIVIDER
38 MIXER
39 AMPLIFIER CIRCUIT
100, 100A, 100B, 200, 300, 300A, 400, 400A, 400B, 500, 900 ANTENNA ELEMENT
110, 110A, 110B, 113 RADIATING ELEMENT
111 MESH ELECTRODE
112 TRANSPARENT ELECTRODE
120, 121, 220, 320, 420 DIELECTRIC LAYER
130 GROUND ELECTRODE
140 RFIC
150, 250, 351, 450, 451, 453, 551, 553 VIA CONDUCTOR
221, 321, 421, 521 HOUSING
350, 450A, 550 COUPLING CONDUCTOR
352, 452, 552 CONDUCTIVE MEMBER
353, 454, 554 LINE CONDUCTOR
1100, 1110, 1120, 1200, 1300, 1310, 1400, 1410, 1420, 1500, 1900 ANTENNA MODULE
3000 COMMUNICATION DEVICE
CL1, CL2 LINEAR CONDUCTOR

The invention claimed is:

1. An antenna element, comprising:
a first RF radiating element having visible light transmittance to visible light, the first RF radiating element includes
a first electrode,
at least one linear conductor,
a second electrode including a material having a visible light transmittance greater than a visible light transmittance of a material that forms the first electrode,
a ground electrode that faces the first RF radiating element in a stacking direction, and
a second RF radiating element disposed between the first RF radiating element and the ground electrode so as to face the first RF radiating element, the second RF radiating element is a power feed element, wherein
a conductivity of the second electrode is smaller than a conductivity of the first electrode,
the first electrode and the second electrode face each other in the stacking direction,
in plan view of the first RF radiating element in the stacking direction, the first RF radiating element includes
a first region in which the first electrode overlaps the at least one linear conductor, and
a second region, in which the first electrode does not overlap the at least one linear conductor,
the first electrode is disposed between the second electrode and the ground electrode, and
the antenna element further comprises a housing, the first RF radiating element being disposed in or above a member that forms the housing.

2. The antenna element according to claim 1, wherein the at least one linear conductor is arranged as a mesh.

3. The antenna element according to claim 2, wherein the antenna element is a patch antenna.

4. The antenna element according to claim 3, wherein the first electrode is disposed between the second electrode and the second RF radiating element.

5. The antenna element according to claim 3, wherein the first RF radiating element is disposed closer to an outer side of the housing than to an inner side of the housing when the housing is viewed in a cross sectional view.

6. The antenna element according to claim 5, wherein the second RF radiating element is disposed closer to the inner edge of the housing than to the outer edge of the housing.

7. The antenna element according to claim 6, wherein in plan view in the stacking direction, a ratio of an area of the second region to an area of the second electrode is 50% or more.

8. A communication device, comprising:
radio frequency circuitry; and
the antenna element according to claim 6, wherein
the radio frequency circuitry is configured to supply a radio frequency signal to the antenna element, and
the housing further accommodates the radio frequency circuitry.

9. A communication device, comprising:
a radio frequency element; and
the antenna element according to claim 5, wherein
the radio frequency element is configured to supply a radio frequency signal to the antenna element, and
the housing further accommodates the radio frequency element.

10. A communication device comprising:
the antenna element of claim 3; and
a liquid crystal member,
wherein the first RF radiating element is disposed on the liquid crystal member.

11. The antenna element according to claim 1, wherein the at least one linear conductor is formed so as to be in contact with the second electrode.

12. The antenna element according to claim 1, wherein the antenna element is a patch antenna.

13. The antenna element according to claim 12, wherein in plan view in the stacking direction, a ratio of an area of the second region to an area of the second electrode is 50% or more.

14. The antenna element according to claim 1, wherein in plan view in the stacking direction, a ratio of an area of the second region to an area of the second electrode is 50% or more.

15. The antenna element according to claim 1, wherein the second electrode includes Indium-Tin-Oxide.

16. An antenna module, comprising:
a radio frequency element; and
the antenna element according to claim 1, wherein
the radio frequency element is configured to supply a radio frequency signal to the antenna element.

17. A communication device, comprising:
radio frequency circuitry; and
the antenna element according to claim 1, wherein
the radio frequency circuitry is configured to supply a radio frequency signal to the antenna element, and
the housing further accommodates the radio frequency circuitry.

18. A communication device comprising:
the antenna element of claim 1; and
a liquid crystal member, wherein the first RF radiating element of the antenna element is disposed on the liquid crystal member.

* * * * *